Figure 1:
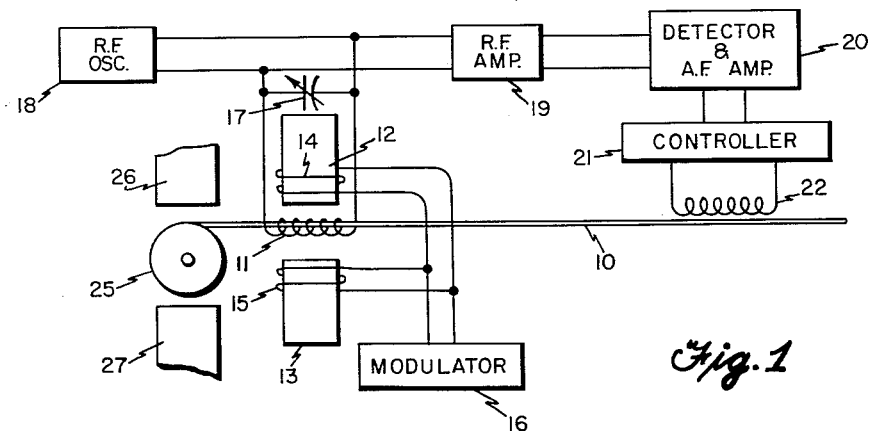

Feb. 13, 1962 A. D. CENNAMO 3,021,475
NUCLEAR MAGNETIC RESONANCE MEASURING SYSTEM
Filed March 31, 1958

INVENTOR
Anthony D. Cennamo

United States Patent Office 3,021,475
Patented Feb. 13, 1962

3,021,475
NUCLEAR MAGNETIC RESONANCE
MEASURING SYSTEM
Anthony D. Cennamo, Columbus, Ohio, assignor to Industrial Nucleonics Corporation, a corporation of Ohio
Filed Mar. 31, 1958, Ser. No. 724,956
2 Claims. (Cl. 324—.5)

This invention relates to nuclear magnetic resonance apparatus, and in particular to improved apparatus of this type for performing measurement and control functions on elongated materials.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession values for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different resonant frequencies.

The absorption phenomenon of nuclear magnetic resonance is also used to measure constituent proportions in various compounds. For example, moisture content measurements can be made in materials, such as tobacco, paper, and yarn. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the raido-frequency field is perpendicular to the magnetic field, and the material to be measured is placed within the coil.

The radio-frequency field, or the magnetic field, is modulated at a slow audio rate. When the radio-frequency and the magnetic fields satisfy the relation $W_1 = \gamma H_0$, where "$W_1$" is the angular velocity of the radio-frequency field $H_1$, "$H_0$" is the permanent magnetic field strength in gauss, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec.$^{-1}$ gauss$^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

With a given amount of absorbing substance, the magnitude of voltage change is proportional to the radio-frequency field strength provided that saturation does not occur. It is therefore desirable to maintain the field strength to as high a value as possible without attaining saturation.

In the absence of damping forces, nuclei placed in a magnetic field would not line up therewith but would continually precess on the axis of the magnetic field. As previously stated, damping forces do exist, and just as the friction of a gyroscope eventually causes it to assume a position of lowest potential energy in the gravitational field, that is line up with the field, so these damping forces eventually suppress the nuclear precession and so allow the nuclear moments to line up with the polarizing magnetic field. A quantity of importance in understanding the present invention is the time required for these damping forces to act. This time, which is called the relaxation time, may have values from $10^{-5}$ seconds or less to many minutes or more.

The following conditions must be fulfilled in measuring instruments operative in response to nuclear magnetic resonance if high accuracy is to be attained:

(1) The magnetic field must be exceedingly uniform in the area of measurement.
(2) The volume of the sample to be measured must be in the magnetic field at least the relaxation time before resonance can occur.
(3) The radio-frequency field must be at right angles to the magnetic field and have as high a value as possible without attaining saturation.

In most measuring and control instruments designed to continuously monitor a moving sample, one or more of the foregoing conditions may be particularly difficult to satisfy. For example, in apparatus for determining and controlling the moisture content of moving cord, thread or like elongated materials, it is difficult to subject the sample to a magnetic field for the relaxation time and also to an intense radio-frequency field transverse to the magnetic field. A uniform magnetic field is difficult to obtain under any circumstances.

Accordingly, a principal object of this invention is to provide improved apparatus for making nuclear magnetic resonance measurements on moving material, particularly on cord, thread and like elongated materials.

Another object is to provide an improved arrangement for subjecting moving material to a magnetic field for the relaxation time required to make nuclear magnetic resonance moisture measurements.

A preferred embodiment of this invention is adapted to the measurement of cord, thread or like elongated materials wound on a spool for storage purposes. As the cord is withdrawn from the spool for processing, it is moved through the center portion of a radio-frequency coil in axial alignment with the longitudinal axis of the coil. This coil is included in a resonant tank circuit energized by a radio-frequency oscillator. Accordingly, the length of the cord positioned within the bore of the coil is subjected to radio-frequency lines of force parallel to and in alignment with the cord.

The coil is disposed between a pair of spaced magnets which develops a magnetic field perpendicular to the interposed length of cord. Modulation coils envelop the pole ends of the magnets so that the otherwise steady magnet field is amplitude modulated by audio-frequency energy supplied from a modulation source. With this arrangement, the requirements for nuclear magnetic resonance are periodically satisfied and the voltage developed across the tank circuit is periodically modulated in accordance with the absorption characteristics of the cord portion under test.

The modulation components that are developed across the tank circuit energize conventional apparatus for producing a control function upon the cord as it emerges from the tank coil. This control function may relate to the heating, drying or wetting of the cord to produce a uniform characteristic as desired; or in the alternative visual measurements may be obtained by readout apparatus, such as an oscilloscope.

In order to satisfy the relaxation time requirement of the rapidly moving cord, the entire spool is subjected to a magnetic field. Consequently, the cord stored on the spool is processed to overcome the relaxation time requirement prior to its entry into the bore of the radio-frequency tank coil.

Figure 2:
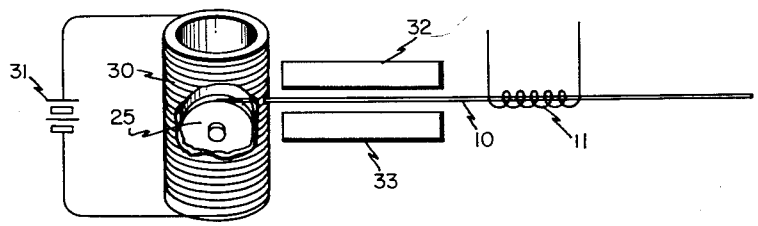

In order that all of the features for attaining the objects of this invention may be readily understood reference is herein made to the drawings wherein:

FIG. 1 is a diagram of a preferred embodiment of the measuring and control apparatus of this invention; and FIG. 2 is a view showing an alternative arrangement for subjecting a storage spool to a magnetic field for overcoming the relaxation time.

Referring now to the preferred embodiment shown in FIG. 1, cordlike material 10 under test passes through the bore of radio-frequency sampling coil 11, in axial alignment with the longitudinal axis of the coil, and is thereby subjected to a radio-frequency field parallel to and aligned with the length of the cord disposed within coil 11. This length of cord is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel-resonant tank circuit connected to the output of constant-current radio-frequency oscillator 18. The tank circuit is tuned to the oscillator frequency and therefore a substantial radio-frequency voltage appears across the combination 11—17. This voltage has a constant amplitude excepting during those periodic instances at which the output frequency of oscillator 18 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance of the voltage appearing across the tank. The periodic absorption of energy by material 10, amplitude modulates the radio-frequency voltage appearing across tank circuit 11—17. The amplitude of this modulation component varies in accordance with the number of nuclei present to absorb energy from tank coil 11. In the event the signal-to-noise ratio is relatively low, coil 11 is preferably constructed so as to have an elongated form and narrow diameter.

The voltage appearing across tank circuit 11—17 is applied to the input of radio-frequency amplifier 19. The signal output of radio-frequency amplifier 19, is in turn applied to the input of detector and audio-frequency amplifier 20 which has an output connected to controller 21.

Controller 21 may be any type of a device responsive to the applied input signal and which will produce a desired output function. For example, the controller may be used to energize a heating coil 22 which is thermally coupled to cord 10 so as to dry or heat the coil in accordance with the moisture content measurements applied by the tank circuit to the controller 21. Other types of readout or control devices may be employed in lieu of the drying or heating controller 21. For example, an oscilloscope (not shown) may be driven by the output signal of the detector and audio-frequency amplifier unit 20 so as to provide visual moisture measurements.

In view of the fact, that cord 10 is moving at a rapid rate it is not possible to subject cord 10 to the magnetic field of magnets 12 and 13 for at least the relaxation time prior to making measurements. Accordingly cord 10 is preferably stored on a spool 25 which is subjected to a magnetic field developed in the gap between magnets 26 and 27. In the usual instance, therefore, substantially all the cord capacity wound on spool 25, will be subjected to the magnetic field for the relaxation time, and therefore the cord may be fed directly into the interior of coil 11 so that measurements may be made therein.

FIG. 2 discloses an alternative embodiment for subjecting cord 10 to a magnetic field for the relaxation time prior to its being drawn through the center of coil 11. In the alternative embodiment, spool 25 is disposed within the central bore portion of coil 30. Coil 30 is energized by direct-current source 31 so that the portion of cord 10 stored on spool 25 is subjected to an intense magnetic field.

Cord 10 passes through and between the side windings of coil 30 and is withdrawn from spool 25. If desired, the magnetic field of coil 30 may be implemented by subjecting a linear portion of the cord 10 to an additional magnetic field generated by elongated magnets 32 and 33. The relaxation time of cord 10 is thus overcome by the two fields generated by coil 30 and magnets 32 and 33. After the cord has been thus processed, it is fed into the bore of tank coil 11 which is included in a circuit that corresponds to the circuit previously described in detail in conjunction with FIG. 1.

It should be understood that the above described arrangements are merely illustrative of the principles of this invention, and that numerous modifications may be devised without departing from the scope of this invention.

What is claimed is:

1. In nuclear magnetic apparatus for subjecting spirally-wound elongated cordlike material withdrawn from a storage spool to the mutually perpendicular magnetic and radio-frequency fields for attaining the nuclear magnetic resonance phenomenon, the improvement comprising a solenoid coil housing the spool and the cordlike material stored thereon within the centermost portion of the solenoid bore, and a direct-current power supply energizing the solenoid coil to subject thereby the cordlike material stored on the spool to a steady magnetizing field prior to entry of the cordlike material into the mutually perpendicular fields.

2. The combination of claim 1 in which the elongated cordlike material is withdrawn from the spool by passing the material through the centermost portion of the solenoid coil and between adjacent turns of the coil, and in which the spool rotates on an axis transverse to a longitudinal axis of the solenoid coil.

References Cited in the file of this patent

UNITED STATES PATENTS 2,721,970     Levinthal  ---------------- Oct. 25, 1955
2,799,823     Shaw et al.  -------------- July 16, 1957
2,826,166     Davis  ------------------ Mar. 11, 1958

FOREIGN PATENTS 1,133,479     France  ---------------- Nov. 19, 1956

OTHER REFERENCES

Brown: Physical Review, vol. 78, No. 5, June 1950, pp. 530 to 532.

Aiken et al.: Control Engineering, vol. 4, No. 6, June 1957, pages 105 to 113.

Andrew: Nuclear Magnetic Resonance, Cambridge University Press, London, 1955, pages 35 through 40 relied on.